United States Patent
Bhatia et al.

(10) Patent No.: US 8,849,647 B2
(45) Date of Patent: Sep. 30, 2014

(54) DUAL-FIRMWARE FOR NEXT GENERATION EMULATION

(75) Inventors: Rajiv Bhatia, Bangalore (IN); Ankit Sihare, Banglore (IN)

(73) Assignee: LSI Corporation, San Jose, CA (US)

( * ) Notice: Subject to any disclaimer, the term of this patent is extended or adjusted under 35 U.S.C. 154(b) by 53 days.

(21) Appl. No.: 13/276,981

(22) Filed: Oct. 19, 2011

(65) Prior Publication Data

US 2013/0103886 A1    Apr. 25, 2013

(51) Int. Cl.
*G06F 12/00* (2006.01)

(52) U.S. Cl.
USPC ............. 703/24; 711/E12.082; 711/E12.069; 711/103; 710/74; 703/25

(58) Field of Classification Search
USPC .......................................................... 711/103
See application file for complete search history.

(56) References Cited

U.S. PATENT DOCUMENTS

| | | |
|---|---|---|
| 5,579,522 A | 11/1996 | Christeson et al. |
| 5,793,943 A | 8/1998 | Noll |
| 5,835,695 A | 11/1998 | Noll |
| 5,870,520 A | 2/1999 | Lee et al. |
| 6,076,142 A | 6/2000 | Corrington et al. |
| 6,185,696 B1 | 2/2001 | Noll |
| 6,571,347 B1 | 5/2003 | Tseng |
| 6,665,813 B1 | 12/2003 | Forsman et al. |
| 6,757,838 B1 | 6/2004 | Chaiken et al. |
| 7,809,886 B2 | 10/2010 | Ashmore et al. |
| 2003/0126493 A1 | 7/2003 | Lee |
| 2003/0217310 A1* | 11/2003 | Ebsen et al. ............ 714/42 |
| 2003/0229775 A1 | 12/2003 | Schelling |
| 2004/0153846 A1 | 8/2004 | Lee |
| 2005/0081090 A1 | 4/2005 | Lin |
| 2006/0015683 A1 | 1/2006 | Ashmore et al. |
| 2009/0271603 A1* | 10/2009 | Wang ........................ 713/2 |
| 2010/0281297 A1* | 11/2010 | Jibbe et al. .............. 714/6 |

* cited by examiner

*Primary Examiner* — Reginald Bragdon
*Assistant Examiner* — Hamdy S Ahmed
(74) *Attorney, Agent, or Firm* — Alexander J. Neudeck; Cochran Freund & Young LLC

(57) ABSTRACT

Disclosed is a host bus adapter (HBA) that to receives an input/output (I/O) command from an operating system I/O driver. Firmware stored on the host bus adapter includes primary firmware and secondary firmware to process the I/O command. The HBA is to respond to the I/O command under the control of one of the primary firmware or secondary firmware. The selected one of said primary firmware and secondary firmware may be used to certify a hardware driver for either the current generation (primary firmware) or a future generation (secondary firmware).

15 Claims, 4 Drawing Sheets

DUAL-FIRMWARE FOR NEXT GENERATION EMULATION

BACKGROUND OF THE INVENTION

A host bus adapter (a.k.a., host controller or host adapter) connects a host system (the computer) to other network and storage devices. A host bus adapter (HBA) bridges the physical, logical, and protocol differences between the host computer's internal bus and an external communication link(s). Host bus adapters may typically contain all the electronics and firmware required to execute transactions on the external communication link. Host bus adapters may typically contain a processor, memory, and I/O such that they may be viewed as computers themselves. Thus, host bus adapters often include a firmware that not only allows the host system to boot from a device connected to the external communication link, but also facilitates configuration of the host bus adapter itself. Typically a device driver, linked to, or contained in, the operating system, controls a host bus adapter.

SUMMARY OF THE INVENTION

An embodiment of the invention may therefore comprise a method of operating a host bus adapter, comprising: retrieving a firmware generation indicator; receiving an input/output (I/O) command; based on said firmware generation indicator, selecting a one of a primary firmware and a secondary firmware to process said I/O command; and, processing said I/O command using said selected one of said primary firmware and said secondary firmware.

An embodiment of the invention may therefore further comprise a host bus adapter, comprising: a host bus link to receive an input/output (I/O) command from an operating system I/O driver; firmware stored on said host bus adapter, said firmware comprising primary firmware and secondary firmware to process said I/O command; and, a processor to respond to the I/O command under the control of one of said primary firmware and said secondary firmware, said processor to select one of said primary firmware and secondary firmware to process said I/O command based on a firmware generation indicator.

DETAILED DESCRIPTION OF THE EMBODIMENTS

Figure 1:
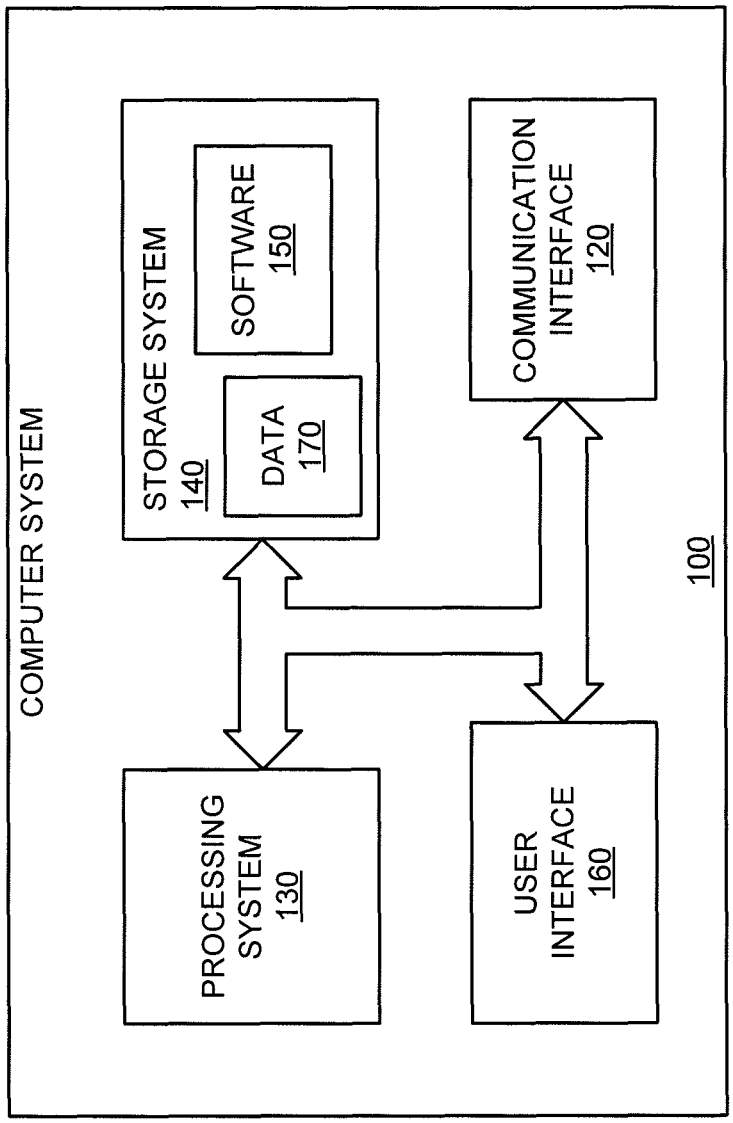
FIG. 1 is a block diagram of a computer system.

FIG. 1 illustrates a block diagram of a computer system. Computer system 100 includes communication interface 120, processing system 130, storage system 140, and user interface 160. Processing system 130 is operatively coupled to storage system 140. Storage system 140 stores software 150 and data 170. Processing system 130 is operatively coupled to communication interface 120 and user interface 160. Computer system 100 may comprise a programmed general-purpose computer. Computer system 100 may include a microprocessor. Computer system 100 may comprise programmable or special purpose circuitry. Computer system 100 may be distributed among multiple devices, processors, storage, and/or interfaces that together comprise elements 120-170.

Communication interface 120 may comprise a network interface, modem, port, bus, link, transceiver, or other communication device. Communication interface 120 may include a host bus and/or host bus adapters providing links to other devices (not shown in FIG. 1). These host bus adapters may include dual firmware. Communication interface 120 may be distributed among multiple communication devices. Processing system 130 may comprise a microprocessor, microcontroller, logic circuit, or other processing device. Processing system 130 may be distributed among multiple processing devices. User interface 160 may comprise a keyboard, mouse, voice recognition interface, microphone and speakers, graphical display, touch screen, or other type of user interface device. User interface 160 may be distributed among multiple interface devices. Storage system 140 may comprise a disk, tape, integrated circuit, RAM, ROM, EEPROM, flash memory, network storage, server, or other memory function. Storage system 140 may include a host bus and/or host bus adapters providing links to other storage devices (not shown in FIG. 1). These host bus adapters may include dual firmware. Storage system 140 may include computer readable medium. Storage system 140 may be distributed among multiple devices.

Processing system 130 retrieves and executes software 150 from storage system 140. Processing system 130 may retrieve and store data 170. Processing system 130 may also retrieve and store data via communication interface 120. Processing system 130 may create or modify software 150 or data 170 to achieve a tangible result. Processing system 130 may control communication interface 120 or user interface 160 to achieve a tangible result. Processing system 130 may retrieve and execute remotely stored software via communication interface 120.

Software 150 and remotely stored software may comprise an operating system, utilities, drivers, networking software, firmware, hardware drivers, and other software typically executed by a computer system. Software 150 may comprise an application program, applet, firmware, or other form of machine-readable processing instructions typically executed by a computer system. When executed by processing system 130, software 150 or remotely stored software may direct computer system 100 to operate. Software 150, or a part of software 150 (such as a hardware driver), may be certified by, for example, an operating system vendor.

Figure 2:
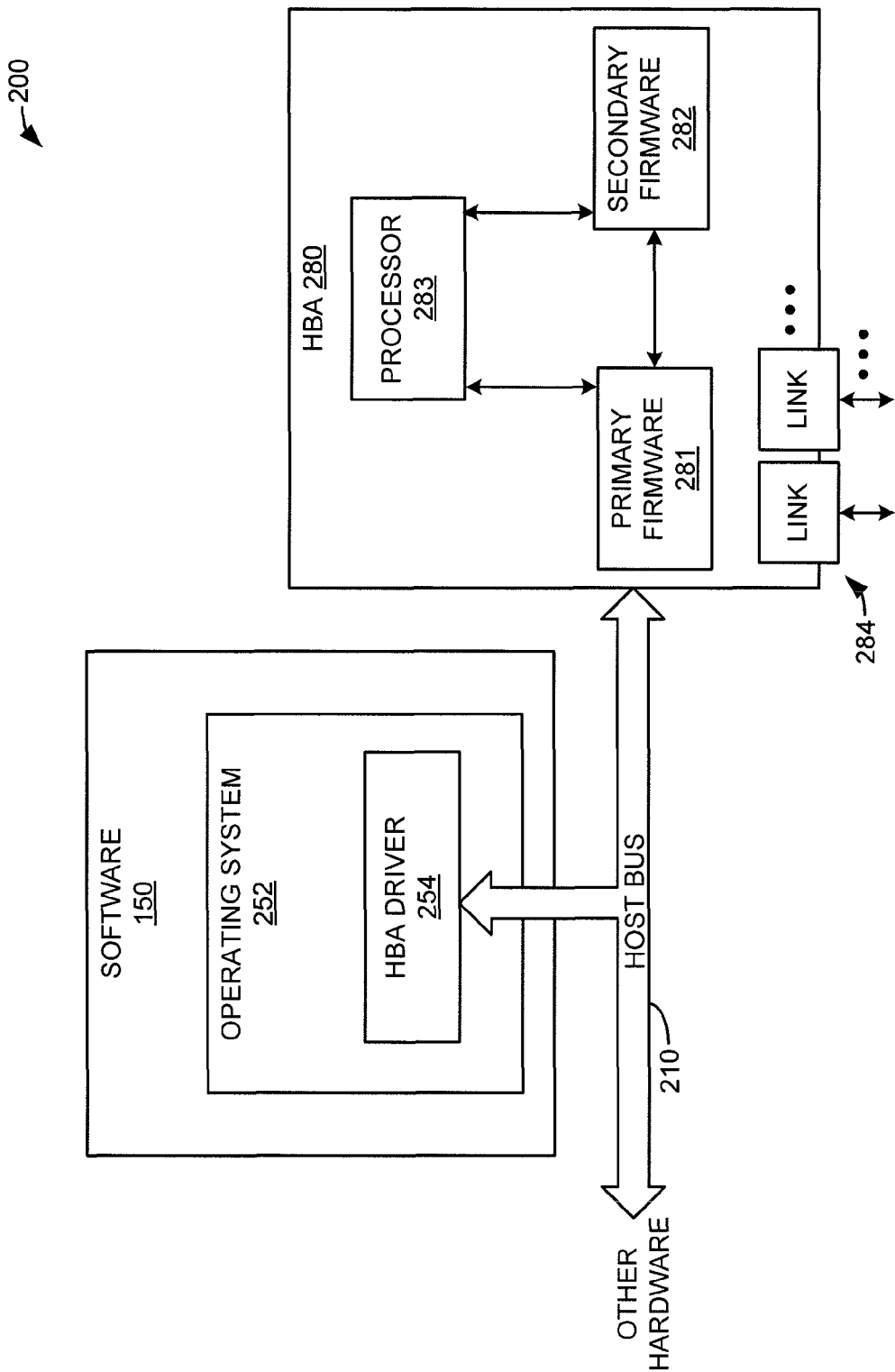
FIG. 2 is a block diagram of a host bus adapter (HBA) subsystem with dual firmware.

FIG. 2 is a block diagram of a host bus adapter (HBA) subsystem with dual firmware. HBA subsystem 200 comprises: software 150, host bus 210, and host bus adapter 280. Software 150 includes operating system 252. Operating system 254 includes, or is operatively coupled to, HBA driver 254. HBA 280 includes processor 283, primary firmware 281, secondary firmware 282, and communication links 284. Host bus 210 operatively couples HBA driver 254 to HBA 280. Thus, HBA driver 254 can send and receive I/O commands and responses to/from HBA 280. HBA 280 may process I/O commands by sending/receive commands and/or responses vi links 284. Host bus 210 may also be coupled to other hardware. In an embodiment, host bus 210 is a PCI-Express (PCIe) bus. In an embodiment, links 284 are serial attached SCSI (SAS) links. In an embodiment, links 284 are SAS links to at least one storage device—such as a disk drive.

In an embodiment, HBA 280 includes at least a primary firmware 281 and a secondary firmware 282. Processor 283 is operatively coupled to execute primary firmware 281 and a secondary firmware 282 in order to process I/O commands received via host bus 210. The I/O commands and responses to the I/O commands sent/received via host bus 210 may be sent/received by HBA driver 254. Primary firmware 281 and secondary firmware 282 may be stored in separate partitions on the same memory or EEPROM. Primary firmware 281 and secondary firmware 282 may be stored on separate memories or EEPROMs. Based on a firmware generation indicator (not shown in FIG. 2), HBA 280 may select one of the primary firmware 281 or the secondary firmware 282 to control the processing of I/O commands received from driver 254 via host bus 210. HBA 280 may process I/O commands received from driver 254 according to the instructions included in the selected firmware.

HBA 280 may be a current generation of hardware. Secondary firmware 282 may control HBA 280 to emulate a next generation of hardware. In other words, if HBA 280 is generation "x" hardware that is normally controlled by primary firmware 281, a firmware generation indicator may cause HBA 280 to execute all or part of secondary firmware 282 instead. When running secondary firmware 282, HBA 280 may emulate a next (i.e., future) generation of HBA 280 (e.g., "x+1").

To help emulate a future generation of HBA 280, HBA 280 may provide a plug-and-play (PNP) identification associated with the future generation of HBA hardware to software 150, operating system 252, and/or HBA driver 254. HBA 280 may provide the PNP identification associated with the future generation of hardware in response to a query for a PNP identification. Based on receiving the PNP identification associated with the future generation HBA hardware, HBA driver 254 may treat HBA 280 as if HBA 280 were the future generation of HBA hardware.

It should be understood, that dual-firmware HBA 280 may allow driver 254 to be certified by operating system providers for use with both the current and next generation HBA hardware. More particularly, driver 254 can be certified for the next generation HBA hardware by setting the firmware generation indicator to cause HBA 280 to execute all or part of secondary firmware 282 instead of primary firmware 281. Thus, dual-firmware HBA 280 allows driver 254 to be made available with new revisions of operating system 252 as an in-box driver. Dual-firmware HBA 280 removes a dependence on the availability of the next generation HBA hardware for certification of driver 254 with both the current and next generation HBA hardware.

Figure 3:
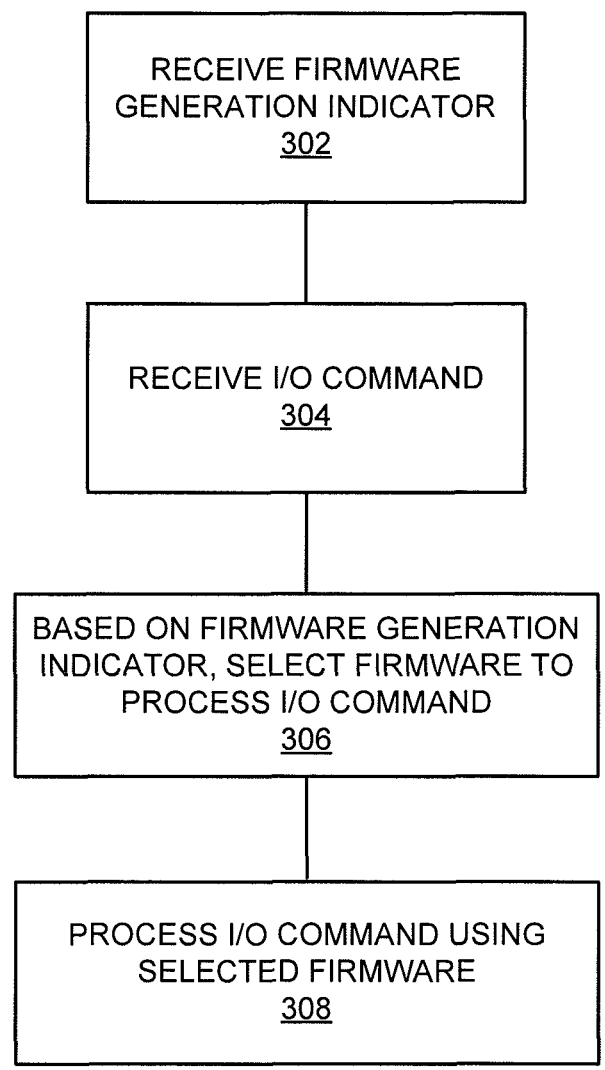
FIG. 3 is a flowchart of a method of operating a host bus adapter with dual firmware.

FIG. 3 is a flowchart of a method of operating a host bus adapter with dual firmware. The steps illustrated in FIG. 3 may be performed by one or more elements of computer system 100 or HBA subsystem 200. A firmware generation indicator is received (302). For example, HBA 280 may retrieve a firmware generation indicator from primary firmware 281 or secondary firmware 282. The firmware generation indicator may cause HBA 280 to execute all or part of primary firmware 281 or secondary firmware 282. The firmware generation indicator may be a flag, pointer, or branch instruction that causes HBA 280 to execute a HBA 280 to execute all or part of primary firmware 281 or secondary firmware 282. When HBA executes all or part of secondary firmware 282, HBA 280 may emulate a future hardware generation of HBA 280.

An I/O command is received (304). For example, HBA 280 may receive an I/O command from driver 254 via host bus 210. Based on the firmware generation indicator, firmware is selected to process the I/O command (306). For example, HBA 280 may select primary firmware 281 or secondary firmware 282 based on the firmware generation indicator.

The I/O command is processed using the selected firmware (308). For example, HBA 280 may execute all or part of the selected one of primary firmware 281 or secondary firmware 282. When primary firmware 281 is selected, HBA 280 may process the I/O command as the current generation of HBA hardware. When secondary firmware 282 is selected, HBA 280 may process the I/O command by emulating future generation of HBA hardware. IN an embodiment, primary firmware 281 and secondary firmware 282 process the same I/O command set.

Figure 4:
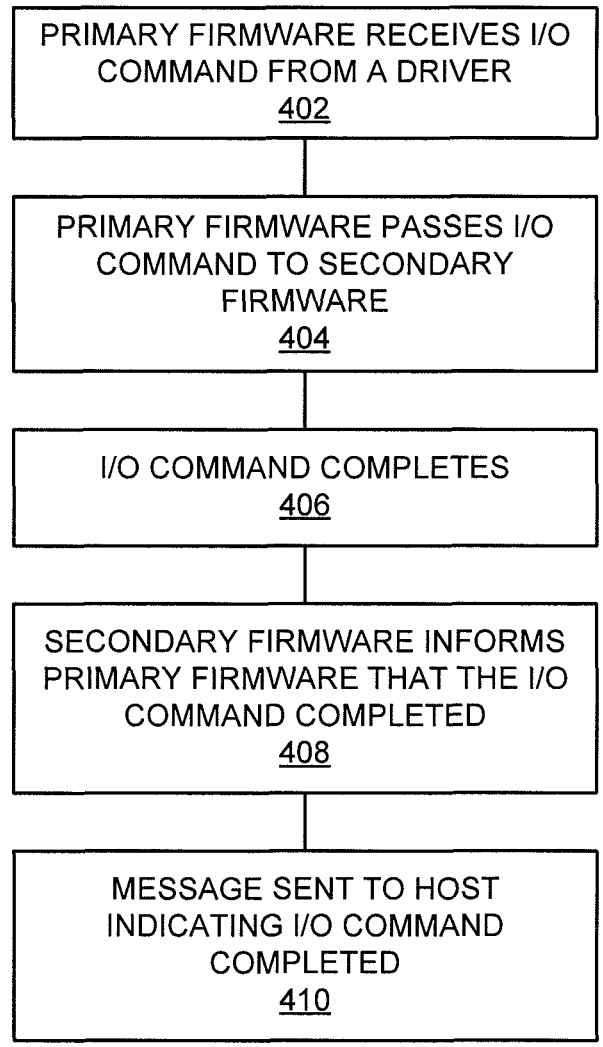
FIG. 4 is a flowchart of a method of operating a host bus adapter with dual firmware.

FIG. 4 is a flowchart of a method of operating a host bus adapter with dual firmware. The steps illustrated in FIG. 4 may be performed by one or more elements of computer system 100 or HBA subsystem 200. Primary firmware receives an I/O command from a driver (402). For example, HBA 280, while executing primary firmware 281, may receive an I/O command from HBA driver 254. Primary firmware passes the I/O command to secondary firmware (404). For example, primary firmware 281 may pass control of HBA 280 to secondary firmware 282 based on a firmware generation indicator. Secondary firmware 282 may control HBA 280 to emulate a future generation of HBA hardware.

The I/O command completes (406). For example, HBA 280 may send commands or communication over links 284 to external I/O devices. When those commands complete, HBA 280, under the control of secondary firmware 282 may receive the results of those external I/O commands. Secondary firmware informs primary firmware that I/O completed (408). For example, secondary firmware 282 may pass control of HBA 280 back to primary firmware 281 along with an indicator that an I/O has completed. A message is sent to the host indicating that the I/O command completed (410). For example, primary firmware 281 may control HBA 280 to send a message to HBA driver 254 via host bus 210. This message may indicate that the I/O command received by HBA 280 has completed.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of operating a host bus adapter, comprising:
   retrieving a firmware generation indicator;
   receiving an input/output (I/O) command;
   based on said firmware generation indicator, selecting a one of a primary firmware and a secondary firmware to process said I/O command, the primary firmware and the secondary firmware simultaneously included on, and executable by the host bus adapter, said host bus adapter being a current generation of hardware and said secondary firmware emulating a next generation of hardware using said current generation of hardware; and,
   processing said I/O command using said selected one of said primary firmware and said secondary firmware.

2. The method of claim 1, further comprising:
   receiving a query for a plug-and-play (PNP) identification;
   in response to said query for said PNP identification, providing a first PNP identification associated with said next generation of hardware.

3. The method of claim 1, wherein said primary firmware and said secondary firmware are stored on separate partitions of an electrically erasable programmable read-only memory (EEPROM).

4. The method of claim 1, wherein, for certification of an operating system driver with said next generation of hardware, said firmware generation indicator is set to select the secondary firmware.

5. The method of claim 1, wherein said primary firmware and said secondary firmware process the same I/O command set.

6. A host bus adapter, comprising:
- a host bus link to receive an input/output (I/O) command from an operating system I/O driver;
- firmware stored on said host bus adapter, said firmware comprising primary firmware and secondary firmware to process said I/O command; and,
- a processor to respond to the I/O command under the control of one of said primary firmware and said secondary firmware, said processor to select one of said primary firmware and secondary firmware to process said I/O command based on a firmware generation indicator, said host bus adapter being a current generation of hardware and said secondary firmware emulating a next generation of hardware using said current generation of hardware.

7. The host bus adapter of claim 6, wherein said host bus link is to receive a query for a plug-and-play (PNP) identification, and in response to said query for said PNP identification, said host bus link is to communicate a first PNP identification associated with said next generation of hardware.

8. The host bus adapter of claim 6, wherein said primary firmware and said secondary firmware are stored on separate partitions of an electrically erasable programmable read-only memory (EEPROM).

9. The host bus adapter of claim 6, wherein, for certification of an operating system driver with said next generation of hardware, said firmware generation indicator is set to select the secondary firmware.

10. The host bus adapter of claim 6, wherein said primary firmware and said secondary firmware control said processor to respond to the same I/O command set.

11. A non-transitory computer readable medium having instructions stored thereon for operating a host bus adapter that, when executed by a computer, at least instruct the computer to:
- retrieve a firmware generation indicator;
- receive an input/output (I/O) command;
- based on said firmware generation indicator, select a one of a primary firmware and a secondary firmware to process said I/O command; and,
- process said I/O command using said selected one of said primary firmware and said secondary firmware, said host bus adapter being a current generation of hardware and said secondary firmware emulating a next generation of hardware using said current generation of hardware.

12. The non-transitory computer readable medium of claim 11, wherein the computer is further instructed to:
- receive a query for a plug-and-play (PNP) identification;
- in response to said query for said PNP identification, provide a first PNP identification associated with said next generation of hardware.

13. The non-transitory computer readable medium of claim 11, wherein said primary firmware and said secondary firmware are stored on separate partitions of an electrically erasable programmable read-only memory (EEPROM).

14. The non-transitory computer readable medium of claim 11, wherein, for certification of an operating system driver with said next generation of hardware, said firmware generation indicator is set to select the secondary firmware.

15. The non-transitory computer readable medium of claim 11, wherein said primary firmware and said secondary firmware process the same I/O command set.

* * * * *